(12) United States Patent
Blanco

(10) Patent No.: US 9,802,712 B2
(45) Date of Patent: Oct. 31, 2017

(54) QUICK RELEASE SYSTEM FOR A COUPLING AND DROGUE ASSEMBLY

(71) Applicant: AIRBUS DEFENCE AND SPACE, S.A., Getafe (Madrid) (ES)

(72) Inventor: Jorge Terron Blanco, Getafe (ES)

(73) Assignee: Airbus Defence and Space, S.A., Getafe (Madrid) (ES)

( * ) Notice: Subject to any disclaimer, the term of this patent is extended or adjusted under 35 U.S.C. 154(b) by 217 days.

(21) Appl. No.: 14/865,068

(22) Filed: Sep. 25, 2015

(65) Prior Publication Data
US 2016/0090188 A1   Mar. 31, 2016

(30) Foreign Application Priority Data

Sep. 25, 2014   (EP) ..................... 14382359

(51) Int. Cl.
*B64D 39/04*   (2006.01)
*B64D 39/06*   (2006.01)
*F16L 37/23*   (2006.01)

(52) U.S. Cl.
CPC .............. *B64D 39/06* (2013.01); *F16L 37/23* (2013.01)

(58) Field of Classification Search
CPC ......... B64D 39/00; B64D 39/04; B64D 39/06
See application file for complete search history.

(56) References Cited

U.S. PATENT DOCUMENTS

| | | | | |
|---|---|---|---|---|
| 5,921,294 A | * | 7/1999 | Greenhalgh | ........... B64D 39/00 137/899.2 |
| 6,119,981 A | * | 9/2000 | Young | ..................... B64D 39/00 244/135 A |
| 6,145,788 A | * | 11/2000 | Mouskis | ................ B64D 39/04 244/113 |
| 6,375,123 B1 | * | 4/2002 | Greenhalgh | ........... B64D 39/04 244/135 A |

(Continued)

FOREIGN PATENT DOCUMENTS

| | | |
|---|---|---|
| DE | 1163619 B | 2/1964 |
| WO | 2014109966 A1 | 7/2014 |

OTHER PUBLICATIONS

Extended European Search Report; dated Feb. 25, 2015; 3 Pages.

*Primary Examiner* — Brian M O'Hara
*Assistant Examiner* — Michael Kreiner
(74) *Attorney, Agent, or Firm* — John S. Artz; Dickinson Wright PLLC

(57) ABSTRACT

The invention refers to a quick released system for coupling (1) and drogue (2) assembly comprises a crown coupling connector (4) suitable for being fixed to the coupling (1) and comprising cavities (14); a plurality of balls (3) housed in the cavities (14) with an emerging part and radially movable; a crown drogue connector (5) suitable for being fixed to the drogue (2), configured to engage and disengage the coupling connector (4) and comprising first recesses (26); and a crown locking ring (6) rotatable between a locked and a released position and comprising second recesses (31). The second recesses (31) are arranged in correspondence with (Continued)

the first recesses (26) when the system is in a released position and, the locking ring (6) in contact with the balls (3) and the first recesses (26) engaged with the emerging part of the balls (3) when the system is in a locked position.

13 Claims, 5 Drawing Sheets

(56) References Cited

U.S. PATENT DOCUMENTS

| | | | | |
|---|---|---|---|---|
| 6,464,173 | B1* | 10/2002 | Bandak | B64D 39/04 244/135 A |
| 2010/0019090 | A1* | 1/2010 | Mouskis | B64D 39/04 244/135 A |
| 2012/0199696 | A1* | 8/2012 | Mouskis | B64D 39/06 244/135 A |

* cited by examiner

QUICK RELEASE SYSTEM FOR A COUPLING AND DROGUE ASSEMBLY

CROSS-REFERENCE TO RELATED APPLICATIONS

The present application claims priority to European Application No. 14382359.9 filed on Sep. 25, 2014 and is hereby incorporated by reference, as though set forth fully herein.

FIELD OF DISCLOSURE

The present invention refers to a quick release system for a coupling and drogue assembly of a hose and drogue system used for in-flight refuelling operations, and specifically for hose and drogue under-wing pods and hose and drogue Fuselage Refuelling Unit (FRU).

An object of the invention is to provide an assembly system that simplifies the installation and removal of the coupling and drogue, without the need of disassembling their surrounding parts.

Another object of the present invention is to provide an assembly system that simplifies the maintenance task required for the coupling and drogue, avoiding managing a large number of pieces and, in consequence, decreasing the time required for these tasks.

BACKGROUND OF THE DISCLOSURE

Aerial refueling allows extending the flight ranges of those aircrafts that have been specifically equipped for carrying it out. The in-flight refueling process involves the transfer of fuel from a tanker aircraft to another aircraft to be refueled, the receiver aircraft.

Currently, one of the most used refueling system type is the hose and drogue system. A hose, equipped with a coupling at its end, is deployed from the tanker and the receiver, equipped with a probe, connects in such a coupling. The coupling latches the receiver probe to ensure the connection during the in-flight refuelling operation.

At the end of the hose, the coupling is assembled to a drogue which has different functions, such as to stabilize the hose movements and/or produce enough resistance to ensure the proper connection of the receiver.

Nowadays the assembly between coupling and drogue is performed via several screws which assure the proper joint of the elements.

U.S. Pat. No. 6,375,123 B1 describes a coupling and a drogue, wherein the coupling ends in a flange to which a ring assembly is attached by bolts. The ring assembly comprises an inner ring, an intermediate ring and an outer ring. The struts of the drogue are mounted on the intermediate ring by way of openings, being free to pivot or rotate about the intermediate ring. The intermediate ring with the struts attached is inserted in the inner ring and held therein by fastening outer ring to inner ring. Finally, the whole assembly is attached to the coupling by bolts. In a preferred embodiment, the number of struts is 36. According to this document and in case of repairing or maintaining tasks in the struts or in other part of the coupling and drogue assembly, it is required to remove a large number of pieces which may be not be involved in the malfunctioning, increasing the time required for the repairing, and making the task more difficult.

In a similar way, U.S. Pat. No. 5,921,294 describes a ring assembly that comprises an outer ring and an inner ring, both including an outside diameter and an inside diameter. The inner ring has a plurality of threaded bores located at different degree intervals, and the outer ring, a plurality of counterbores equally positioned. Struts are located between the inner ring and the outer ring, and bolts attach the inner ring to the outer ring clamping the struts therebetween. As described in patent U.S. Pat. No. 6,375,123 B1, these bolts attached the ring assembly to a flange provided at the end of the coupling. Therefore, this invention entails the same limitations as the previously cited document.

Application US 2012/0199696 A1 describes a drogue assembly comprising a coupling and a drogue canopy connected to the coupling by connection means which hold the canopy in an operative, drag producing, position relative to the coupling during refueling. The connection means comprise tether elements (cords and springs), latch elements, and control means for controlling the latch element, wherein the latch element holds the tether element against release to keep the canopy in the operative position. The document focuses on achieving a predictable fly and an easily open up of the drogue when it is ejected into the airstream. The attachments with the coupling are done in a permanently way and trough latch elements which are able to pivot around its mounting between a retaining and a release position of the canopy. Therefore, the drogue assembly described therein results in a complicated embodiment in terms of number of pieces and potential repairing tasks.

Additionally, documents U.S. Pat. No. 6,145,788 and US2010/0019090 A1 describe different drogue assemblies, both based on known ways for the coupling and drogue attachment.

The conventional screw joint between coupling and drogue has several disadvantages for the installation and removal of the coupling and drogue assembly, specifically, it is firstly required to remove their surrounding parts to have access to the joining elements, having to manage several parts even when they are not involved in the damage. In consequence, the operation time needed for the maintenance and repairing tasks increases.

Therefore, it has been detected the need in the aeronautical industry, for a new assembly system for coupling and drogue which is capable of simplifying the installation and removal of the coupling and drogue, avoiding the need of disassembling surrounding pieces, and reducing the time required for maintenance and repairing tasks.

SUMMARY OF THE DISCLOSURE

The present invention overcomes the above mentioned drawbacks by providing a quick release system for a coupling and drogue assembly of a hose and drogue system for in-flight refueling operations. The invention provides an assembly system that simplifies the installation and removal of the coupling and drogue, and prevents from disassembling pieces which do not form part of the assembly. This way, the invention provides an assembly system which reduces the complexity and the time conventionally required for the assembly and disassembly of the coupling and drogue.

An aspect of the invention refers to a quick release system for a coupling and drogue assembly of a hose and drogue system for in-flight refueling, wherein the quick release system comprises a coupling connector, a plurality of metallic balls, a drogue connector, and a locking ring. The coupling connector is suitable for being fixed to the coupling and has a circular crown configuration with outer and inner surfaces, wherein said coupling connector comprises a plurality of passing-through cavities arranged in radial positions around the crown, wherein each cavity has accesses from both surfaces. The plurality of metallic balls are housed in the cavities of the coupling connector and are radially movable therein, wherein each ball has a diameter smaller or at least equal than the outer surface access and larger than the inner surface access, so that each ball can have a partially emerging part through the inner surface access. The drogue connector is suitable for being fixed to the drogue and is configured to engage and disengage with the coupling connector. The drogue connector has a circular crown configuration and comprises a parametric wall configured to engage with the inner surface of the coupling connector, said parametric wall having a plurality of first recesses around the crown in correspondence with the positions of the coupling connector cavities. The locking ring has a circular crown configuration with a contacting surface. The locking ring is mounted on the outer surface of the coupling connector and is rotatable between a locked position and a released position. Additionally, the locking ring comprises a plurality of second recesses, around the contacting surface of the crown, in correspondence positions with the first recesses. The second recesses are configured to receive a part of the balls when said balls are radially moved. The second recesses of the locking ring are arranged in correspondence with the first recesses of the coupling connector when the system is in a released position, such as the system is disengaged and, the contacting surface of the locking ring is in contact with the balls and the first recesses engaged with the emerging part of the balls when the system is in a locked position, such as the system is engaged.

The system according to the invention joins the coupling and drogue by means of a crown piece assembly linked by metallic balls. The crown assembly comprises the coupling connector which constitutes an interface with the coupling, the drogue connector which similarly constitutes an interface with the drogue, and the locking ring which is positioned in between. The crown assembly is completed with a plurality of metallic balls which, together with the crown pieces configuration, allows the assembly and disassembly of the crown pieces in a quick and easy way.

The coupling connector is configured to comprise a side compatible with the coupling for their fixing. Besides, the coupling connector comprises a plurality of cavities for lodging the metallic balls. The cavities are passing-through and are configured to retain the balls so that the balls can perform radial movements towards the outer surface of the coupling connector and, so that a part of the balls can emerge through the inner surface of the coupling connector. The balls will be radially movable inside the cavities when the system is in a released position and, during the assembly and disassembly of the system of the invention, since the emerging parts of the balls will be retained by the first recesses of the drogue connector when the system is assembled, either in a locked or in a release position. In this last scenery, the balls will be able to leave the first recesses engagement thanks to their possible radial movements.

The drogue connector is configured to comprise a side compatible with the drogue for their fixing. Besides, the drogue connector is configured to engage and disengage the coupling connector. For that, the drogue connector has a parametric wall in an outer surface of its circular crown configuration that comprises a plurality of first recesses. These first recesses are located in matching positions with respect to the cavities of the coupling connector, and will receive the emerging parts of the balls when the system is assembled, either in a locked or in a release position. When the system is in a locked position, the balls cannot move radially and the first recesses will engage the emerging part of the balls, maintaining the system securely assembled.

The locking ring is mounted onto the outer surface of the coupling connector in a rotatable manner between the locked position and the released position. The locking ring has a circular crown configuration with a contacting surface provided with a plurality of second recesses. These second recessed are configured to receive a part of the balls when are radially moved. Thus, when the system is in the locked position, the contacting surface is in contact with the balls, avoiding their radial movements inside the cavities and maintaining the system securely assembled, whereas when the system is in the release position, the second recesses are arranged in correspondence with the first recesses of the drogue connector, allowing the balls perform radial movements.

The invention offers an integrated and compact solution that provides a quick release system for the coupling and drogue assembly/disassembly, which is able to change between a locked position and a released position with the only rotation of the locking ring. Thus, the system of the invention simplifies and facilitates the tasks of operators that involve the managing of the coupling and drogue.

As mentioned, provided the system is assembled, if the rotation of the locking ring is such that the second recesses of the locking ring are located in matching positions with respect to the first recesses of the drogue connector, the system is in a released position. Otherwise, the system is in a locked position. Therefore, the system of the invention acts as a quick release system for the installation and removal of the coupling and drogue, facilitating their handling for the operators, and reducing the number of pieces conventionally used for the assembly/disassembly of the coupling and drogue.

Additionally, the quick release system avoids the need of disassembling surrounding pieces that are not involved in a possible malfunctioning of the coupling or the drogue. This way, the system avoids the need of handling a large number of pieces in repairing and maintaining tasks, reducing the time required for these tasks and simplifying them.

In addition, the system of the invention couples perfectly with conventional coupling and drogue, without requiring performing any modification in them. Thus, the system offers a solution easy to integrate in coupling and drogue already in use.

BRIEF DESCRIPTION OF THE DRAWINGS

For a better comprehension of the invention, the following drawings are provided for illustrative and non-limiting purposes, wherein.

DETAILED DESCRIPTION

Figure 1:
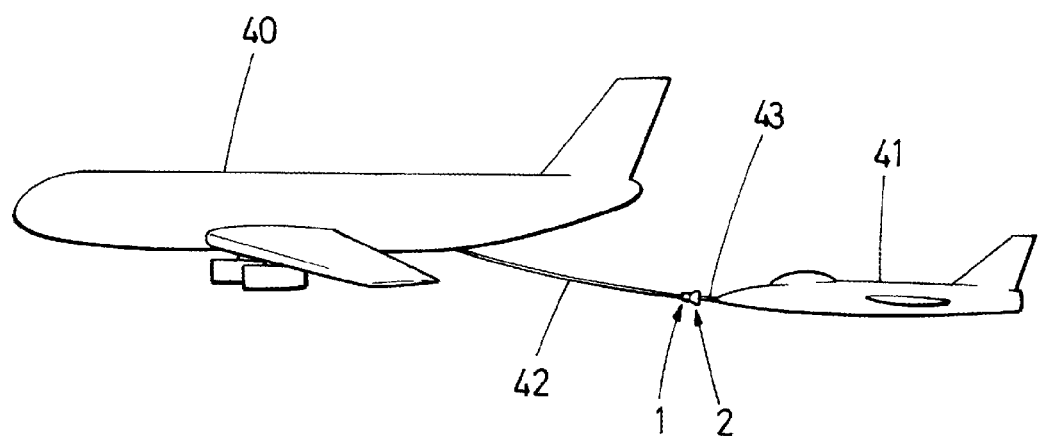
FIG. 1 shows a schematic view of a refueling operation between a tanker aircraft and a receiver aircraft using a hose and drogue system.

FIG. 1 shows an in-flight refueling between a tanker 40 and a receiver aircraft 41 by means of a hose and drogue system. For the in-flight refueling, the tanker aircraft 40 is provided with a flexible hose 42 ended in a coupling 1 equipped with a drogue 2, while the receiver aircraft 41 is provided with a probe 43 formed as a rigid arm and placed on the receiver aircraft's 41 nose. The coupling 1 is configured to engage the probe 43 and control the pass of fuel, while the drogue 2 is configured to stabilize the flight of the hose 42, once it has been deployed from the tanker aircraft 40.

Figure 2:
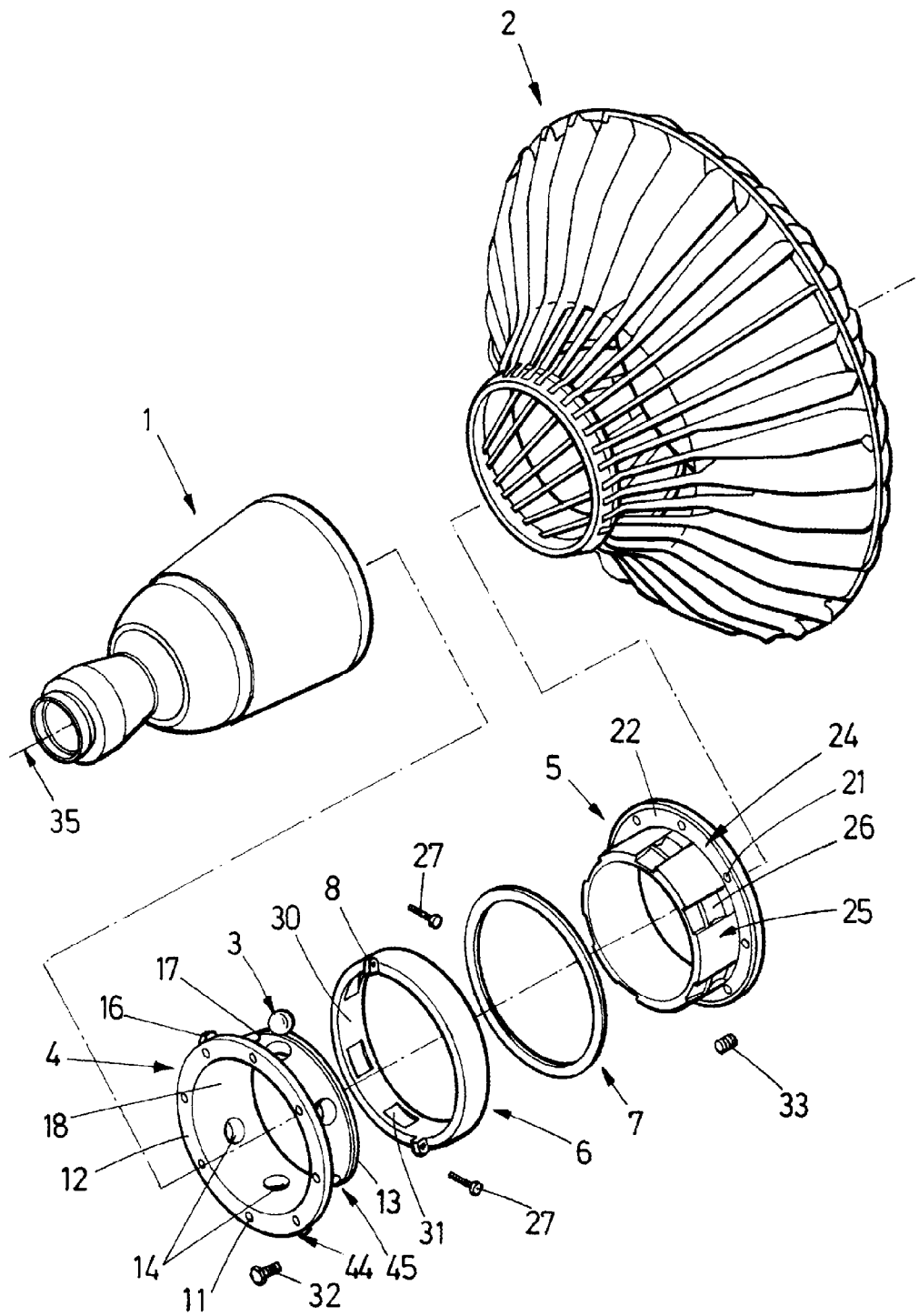
FIG. 2 shows an exploded view of embodiment of the present invention, showing the coupling connector, the locking ring, a circlip, and the drogue connector between the coupling and the drogue.

FIG. 2 shows an exploded view of the coupling 1, an embodiment of the quick release system of the invention, and the drogue 2, wherein all the pieces are aligned around a longitudinal axis 35, as indication of the mounting. The quick release system depicted comprises the coupling connector 4, the balls 3, the locking ring 6, a circlip 7 and the drogue connector 5.

The coupling connector 4 of the figure comprises an outside diameter 44 and an inside diameter 45, the outside diameter 44 with an outer perimeter 12 configured for the fixing of the coupling connector 4 to the coupling 1, and the inside diameter 45 with an inner perimeter 13 configured for its matching with the drogue connector 5. As shown, the outer perimeter 12 comprises threaded holes 11 suitable for receiving screws 32 for fixing the coupling connector 4 with the coupling 1. The inside diameter 45 of the coupling connector 4 is provided with the outer surface 17 and the inner surface 18. As shown, both surfaces 17, 18 are pierced by a plurality of passing-through cavities 14 of a preferred spherical shape. The cavities 14 are arranged in radial positions around the coupling connector crown and are configured to receive the metallic balls 3. The diameter of the inner surface 18 access will be lower than diameter of the outer surface 17 access, for that, balls 3 can perform radial movements through their outer surface 17 accesses. Besides, balls 3 will be introduced by the outer surface 17 access and retain in the cavities. Therefore, balls 3 are such that have a diameter smaller or at least equal than the outer surface 17 access and larger than the inner surface 18 access.

The locking ring 6, also having a circular crown configuration, has a contacting surface 30 corresponding with its inner surface and provided with a plurality of second recesses 31, preferentially, of cylindrical shaped. The contacting surface 30 is configured to be mounted onto the outer surface 17 of the coupling connector 4, so that the second recesses 31 allow the balls 3 move radially. The balls 3 will be able to move when the second recesses 31 are arranged in matching positions with respect to the cavities 14 of the coupling connector 4, which will coincide with the second recesses 31 are arranged in matching positions with respect to the first recesses 26 of the drogue connector 5. When the second recesses 31 allow the balls to move radially, the system will be in released position, while when the second recesses 31 do not allow their movement, the system will be in locking position. Changing between one position and another only requires the rotation of the locking ring 6. This produces a simplification of the tasks of operators in charge of repairing or monitoring the coupling and drogue assembly, together with a decrease in the time required for said tasks.

The system shown in FIG. 2 additionally comprises a circlip 7 for retaining the locking ring 6. According to a preferred embodiment, the circlip 7 will be received in a circumferential groove 15 performed in the coupling connector 4.

Similarly to the coupling connector 4, the drogue connector 5 comprises a circular crown configuration with an outside diameter and an inside diameter, the outside diameter formed as a thickened rim 24 and larger than the inside diameter. The rim 24 has an outer perimeter 23 and an inner perimeter 22, the outer perimeter 23 configured to fix the drogue connector 5 with the drogue 2, and the inner perimeter 22 configured to match the coupling connector 4. As shown, the inner perimeter 22 comprises threaded holes 21 suitable for receiving screws 33 for fixing the drogue connector 5 with the drogue 2. The inside diameter of the drogue connector 5 corresponding with parametric wall 25 is configured to engage the inner surface 18 of the coupling connector 4. The parametric wall 25 is provided with a plurality of first recesses 26 arranged in radial positions around it and in matching positions with respect to the cavities 14 of the coupling connector 4. Preferentially, the first recesses 26 are of cylindrical shape.

Figure 3:
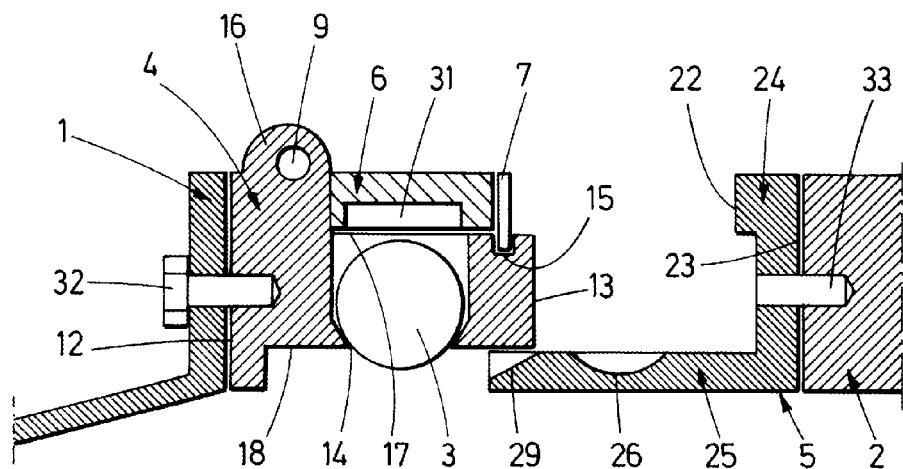
FIG. 3 shows a cross section view of the quick release system corresponding to a stage of its assembly, according to an embodiment of the present invention.
Figure 4:
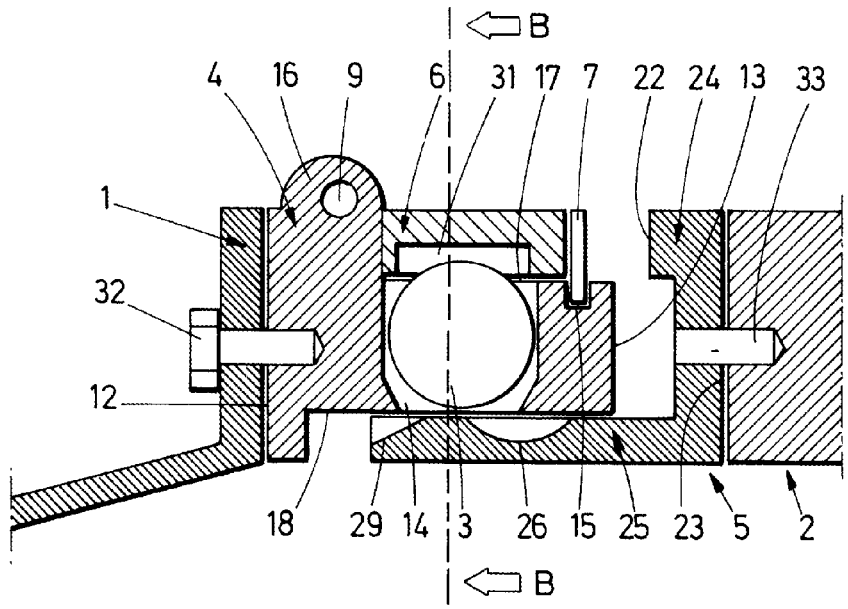
FIG. 4 shows a cross section view of the quick release system in a further stage of the assembly shown in FIG. 3, according to an embodiment of the present invention.

FIGS. 3 and 4 show different stages of the assembly of the quick release system with the coupling 1 and drogue 2. For the assembly, the coupling connector 4 housed the balls 3 and is fixed to the coupling 1, whereas the drogue connector 5 is fixed to the drogue 2. Thus, the coupling connector 4 is fixed to the coupling 1 via screws 32 similar to that conventionally used for the drogue 2 direct assembly; the metallic balls 3 are placed into the cavities 14 of the coupling connector 4; and the locking ring 6 is mounted over the coupling connector 4. During the assembly, the locking ring 6 keeps the metallic balls 3 into the cavities 14 of the coupling connector 4. As shown in FIG. 2 and according to a preferred embodiment, the quick release system comprises a circlip 7, and the coupling connector 4 comprises a circumferential groove 15 to receive the circlip 7 at its free end. The circlip 7 is configured to retain the locking ring 6. On the other hand, the drogue connector 5 is fixed to the drogue 2 by headless screws 33 via pre-existing drogue assembly holes. To enable the assembly, the locking ring 6 is mounted with the second recesses 31 of its contacting surface 30 arranged in correspondence with the first recesses 26 of the drogue connector 5, and these first recesses 26 in correspondence with the cavities 14 of the coupling connector 4. This way, as shown in FIGS. 4 and 5, the balls 3 can move radially inside the cavities 14 and their emerging parts can perform the engagement between the coupling connector 4 and the drogue connector 5.

According to another preferred embodiment, the parametric wall 25 of the drogue connector 5 comprises a flared end 29 to facilitate its assembly with the drogue connector 4.

FIG. 4 shows a stage of the assembly in which the second recess 31 of the locking ring 6 receives a part of the ball 3 to allow the assembly, with the first recess 26 of the drogue connector 5 in correspondence with the cavity 14 of the coupling connector 4.

Figure 5:
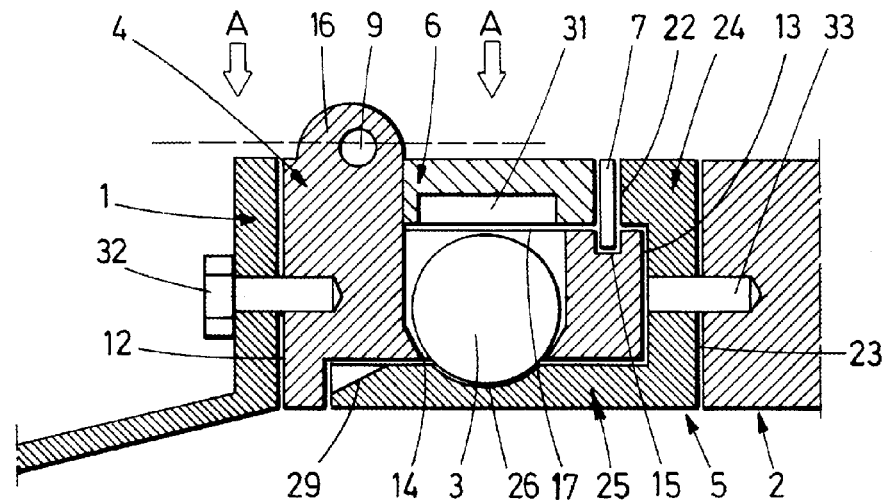
FIG. 5 shows a cross section view of the quick release system assembled and in a released position, according to an embodiment of the present invention.

FIG. 5 shows a further stage of the assembly process shown in FIG. 4 in which the quick release system is assembled and fixed to the coupling 1 and to the drogue 2. Being as the second recesses 31 of the locking ring 6 are arranged in correspondence with the first recesses 26 of the drogue connector 5, the balls 3 are movable inside the cavities 14, and the system is in released position.

According to another preferred embodiment the drogue connector 5 comprises a thickened rim 24, wherein said rim 24 is configured to match the circlip 7. This thickened rim 24 covers at least a part of the free end of the coupling connector 4, resulting in a complete assembly with pieces perfectly fitted.

According to another preferred embodiment, the coupling connector 4 and the locking ring 6 comprise at least one outwardly extended radial projection 16, 8. Preferentially, both the coupling connector 4 and the locking ring 6 comprise two outwardly extended radial projections 16, 8 at diametrically opposed positions. And in another preferred embodiment, each outwardly extended radial projection 16, 8 comprises a hole 9, 10.

Figure 6:
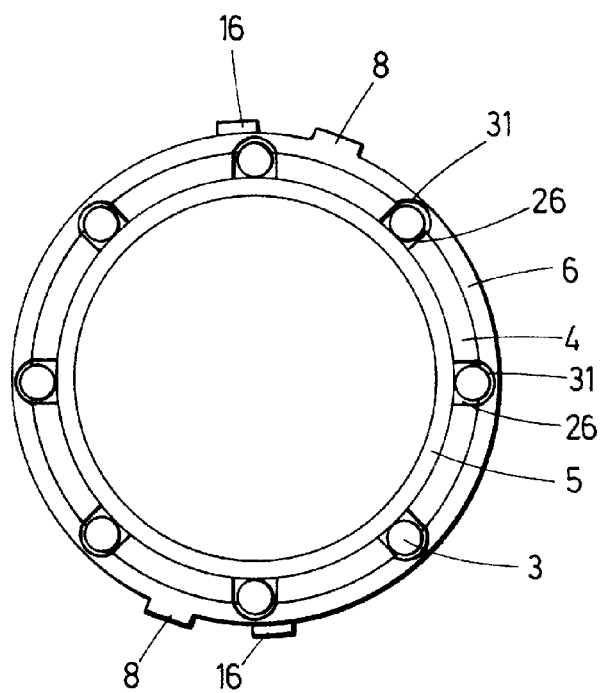
FIG. 6 shows a cross section view along the sectional lines B-B depicted in FIG. 4.

FIGS. 3 to 5 shows the outwardly extended radial projection 16 of the coupling connector 4, wherein said projection 16 comprises a hole 9. FIG. 6 shows a cross view along the B-B sectional lines depicted in FIG. 4 in which both projections 16, 8 of the coupling connector 4 and the locking ring 6 can be appreciated. Preferentially, the projections 16, 8 are located in different radial positions, provided that allow their overlapping, or at least their contact, to enable the use of locking means that use the holes 9, 10 of the projections 16, 8 to lock the system. Locating the projections 16, 8 at spaced radial positions facilitates the rotation of the locking ring 6 to lock/release the system.

Figure 7:
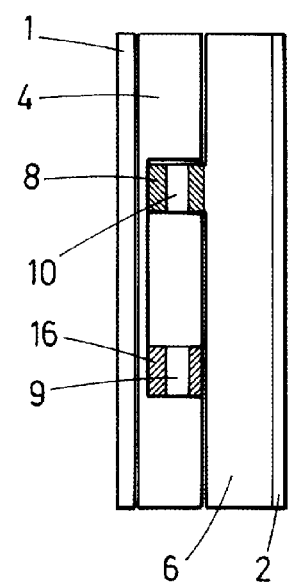
FIG. 7 shows a cross section view along the sectional lines A-A depicted in FIG. 5.

FIG. 7 shows a cross view along the A-A sectional lines depicted in FIG. 5 in which the holes 9, 10 of the projections 16, 8 of the coupling connector 4 and of the locking ring 6 can be appreciated.

Figure 8:
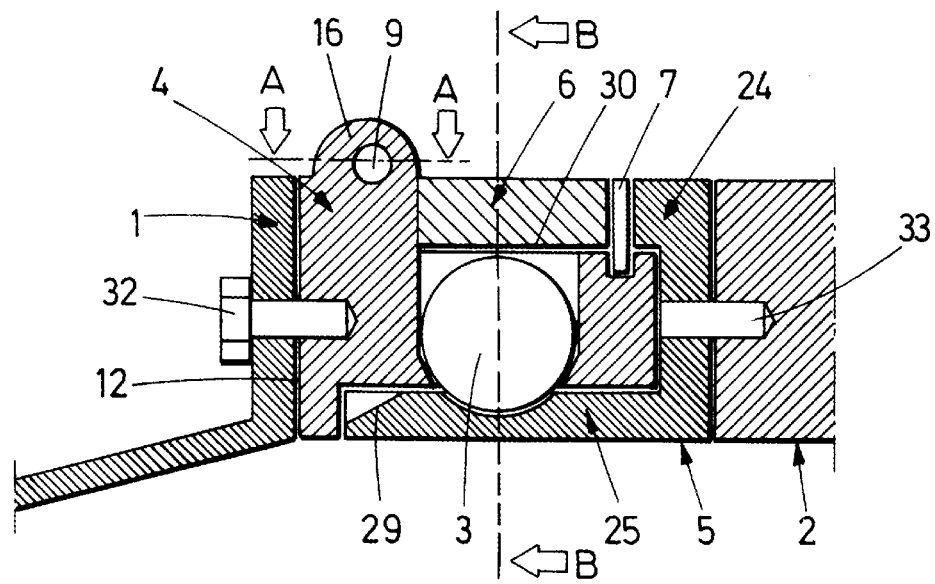
FIG. 8 shows a cross section view of the quick release system in a locked position, according to an embodiment of the present invention.

FIG. 8 shows a cross section view of the quick release system completely assembled and locked. For providing the locking position, the locking ring 6 is rotated, so that the second recesses 31 of the locking ring 6 no longer match the first recesses 26 positions of the drogue connector 5. Then, unlike shown in FIG. 5, the contacting surface 30 of the locking ring 6 is in contact with the balls 3 and the emerging part of the balls 3 are engaged to the first recesses 26 of the drogue connector 5. This way, balls 3 cannot move inside the cavities 14, retaining the pieces of the quick release system securely engaged.

According to another preferred embodiment, the quick release system comprises locking means for retaining the quick release system in the locked position. Preferentially, the locking means comprises locking pins 27 and wire 28, the locking pins 27 introduced between the coupling connector 4 and locking ring 6 holes 9, 10, and the wire 28 arranged to fix the projections 16, 8 of the coupling connector 4 and the locking ring 6 together.

Figures 9, 10:
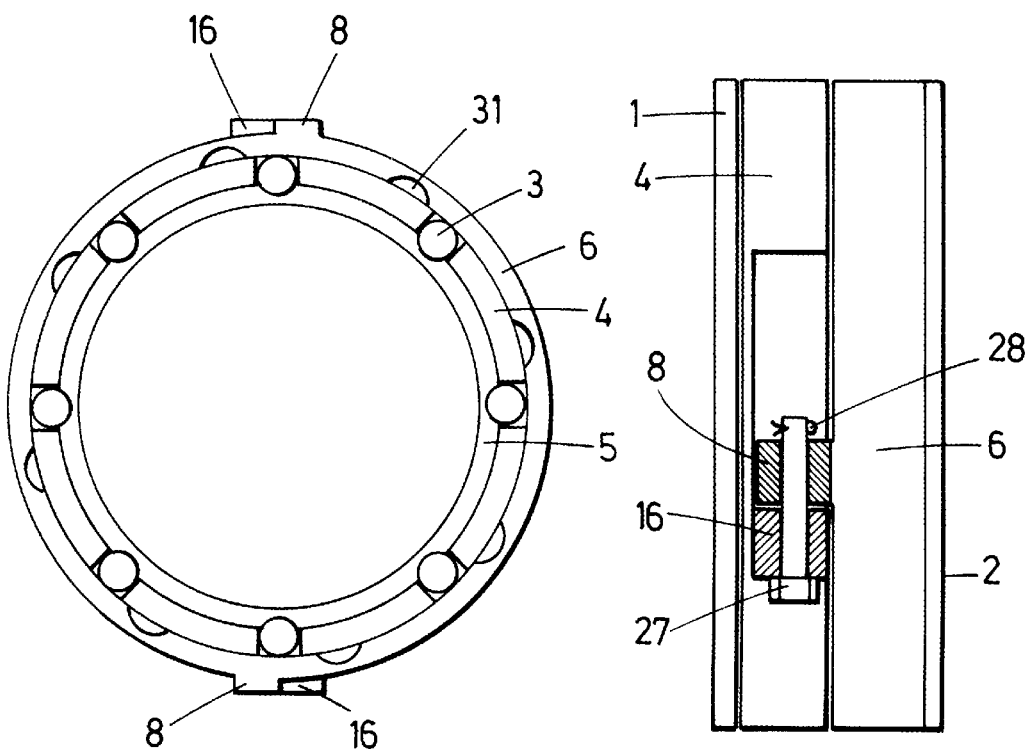
FIG. 9 shows a cross section view along the sectional lines B-B depicted in FIG. 8.
FIG. 10 shows a cross section view along the sectional lines A-A depicted in FIG. 8.

FIGS. 9 and 10, similarly to FIGS. 6 and 7, show respective cross section views along B-B and A-A sectional lines depicted in FIG. 8. FIGS. 9 and 10 show contacting projections 16, 8 for the locking state. FIG. 9 shows the second recesses 31 of the locking ring 6 in rotated positions with respect to the cavities 14 that housed the balls 3, and to the first recesses 26 which engage them. FIG. 10 shows a locking pin 27 installed into the coupling connector 4 and locking ring 6 by means of their projections 16, 8 and via the projection's holes 9, 10 for retaining the quick release system in a locked position. Additionally, the embodiment shown in FIG. 10 comprises wire 28 to fix the projections 16, 8 of the coupling connector 4 and the locking ring 6 together.

What is claimed:

1. A quick release system for a coupling (1) and drogue (2) assembly of a hose and drogue system for in-flight refueling, the quick release system comprising:
   a coupling connector (4) suitable for being fixed to the coupling (1), the coupling connector (4) having a circular crown configuration with outer (17) and inner (18) surfaces, wherein the coupling connector (4) includes a plurality of passing-through cavities (14) arranged in radial positions around the crown and wherein each cavity (14) has accesses from both surfaces (17, 18);
   a plurality of metallic balls (3) housed in the cavities (14) and radially movable therein, each ball (3) having a diameter smaller or at least equal than the outer surface (17) access and larger than the inner surface (18) access, so that each ball (3) can have a partially emerging part through the inner surface (18) access;
   a drogue connector (5) suitable for being fixed to the drogue (2) and configured to engage and disengage with the coupling connector (4), the drogue connector (5) having a circular crown configuration and having a parametric wall (25) configured to engage with the inner surface (18) of the coupling connector (4), said parametric wall (25) having a plurality of first recesses (26) around the crown in correspondence with the cavities (14) positions;
   a locking ring (6) having a circular crown configuration having a contacting surface (30), wherein the locking ring (6) is mounted on the outer surface (17) of the coupling connector (4) and being rotatable between a locked position and a released position, the locking ring (6) having a plurality of second recesses (31) around the contacting surface (30) of the crown in correspondence positions with the first recesses (26), the second recesses (31) configured to receive a part of the balls (3) when they are radially moved,
   wherein the second recesses (31) are arranged in correspondence with the first recesses (26) when the system is in a released position, such as the system is disengaged, and,
   wherein the contacting surface (30) of the locking ring (6) is in contact with the balls (3) and the first recesses (26) are engaged with the emerging part of the balls (3) when the system is in a locked position, such as the system is engaged.

2. The quick release system of claim 1 further comprising a circlip (7), and wherein the coupling connector (4) has an end suitable for being fixed to the coupling (1) and a free end, and a circumferential groove (15) provided at its free end configured to receive the circlip (7).

3. The quick release system of claim 2, wherein the drogue connector (5) comprises a thickened rim (24), said rim (24) configured to match the circlip (7).

4. The quick release system of claim 1, wherein the coupling connector (4) and the locking ring (6) comprise at least one outwardly extended radial projection (16, 8).

5. The quick release system of claim 4, wherein both the coupling connector (4) and the locking ring (6) include two outwardly extended radial projections (16, 8) at diametrically opposed positions.

6. The quick release system of claim 4, wherein at least one of the outwardly extended radial projection (16, 8) comprises a hole (9, 10).

7. The quick release system of claim 1 further comprising a locking means for retaining the quick release system in a locked position.

8. The quick release system of claim 7, wherein the locking means includes locking pins (27) introduced into the coupling connector (4) and locking ring (6) holes (9, 10), and wire (28) to fix the projections (16, 8) of the coupling connector (4) and the locking ring (6) together.

9. The quick release system of claim 1, wherein the parametric wall (25) of the drogue connector (5) has a flared end (29).

10. The quick release system of claim 1, wherein the coupling connector (4) and the drogue connector (5) include threaded holes (11, 21) for fixing the coupling connector (4) and the drogue connector (5) include threaded holes (11, 21) with the coupling (1) and with the drogue (2).

11. The quick release system of claim 1, wherein the cavities (14) of the coupling connector (4) are of spherical shape.

12. The quick release system of claim 1, wherein the first recesses (26) of the drogue connector (5) are of cylindrical shaped.

13. The quick release system of claim 1, wherein the second recesses (31) of the locking ring (6) are of cylindrical shaped.

\* \* \* \* \*